George B. Deardorff's Impd Harvester Platform.

117055

PATENTED JUL 18 1871

George B. Deardorff's Impd Harvester Platform.

Witnesses,

UNITED STATES PATENT OFFICE.

GEORGE B. DEARDORFF, OF CANAL DOVER, OHIO.

IMPROVEMENT IN HARVESTER-PLATFORMS.

Specification forming part of Letters Patent No. 117,055, dated July 18, 1871.

*To all whom it may concern:*

Be it known that I, GEORGE B. DEARDORFF, of Canal Dover, in the county of Tuscarawas and State of Ohio, have invented an Improved Harvester-Platform; and I do hereby declare that the following is a full and exact description thereof, reference being had to the accompanying drawing making part of this specification—

Figure 1:
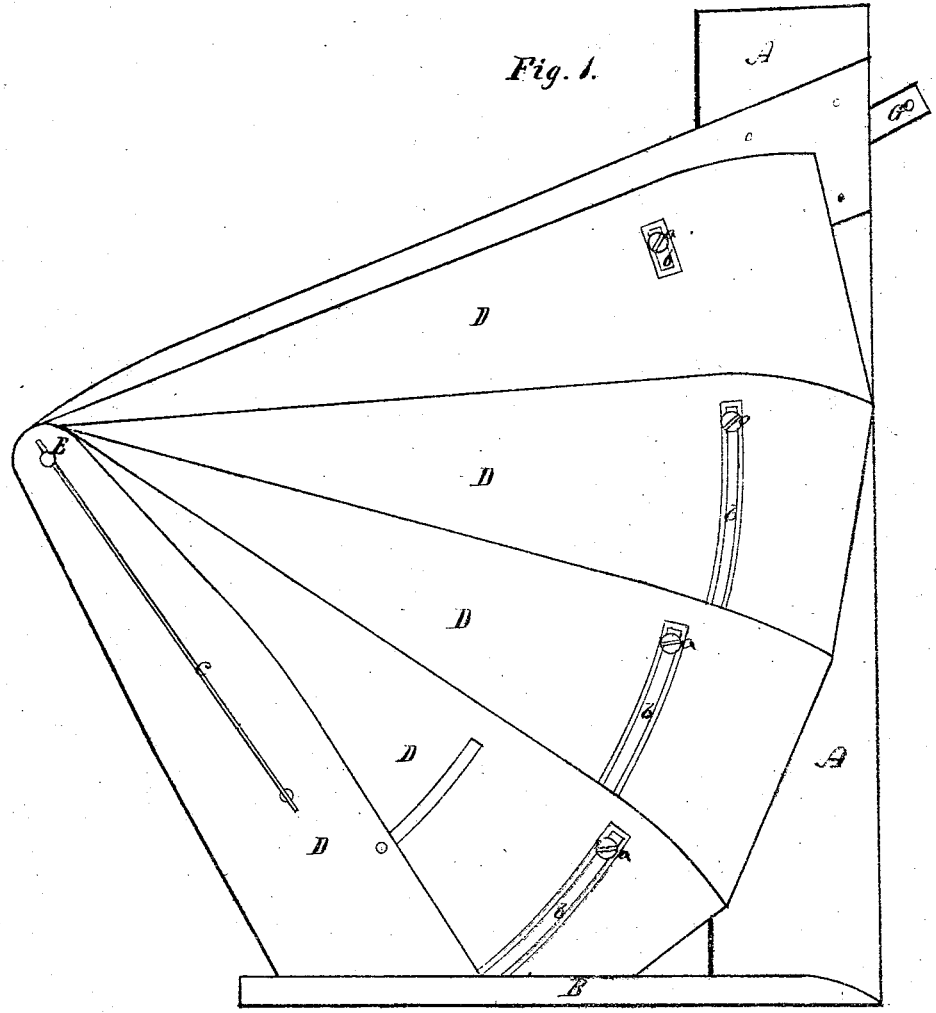
Figure 2:
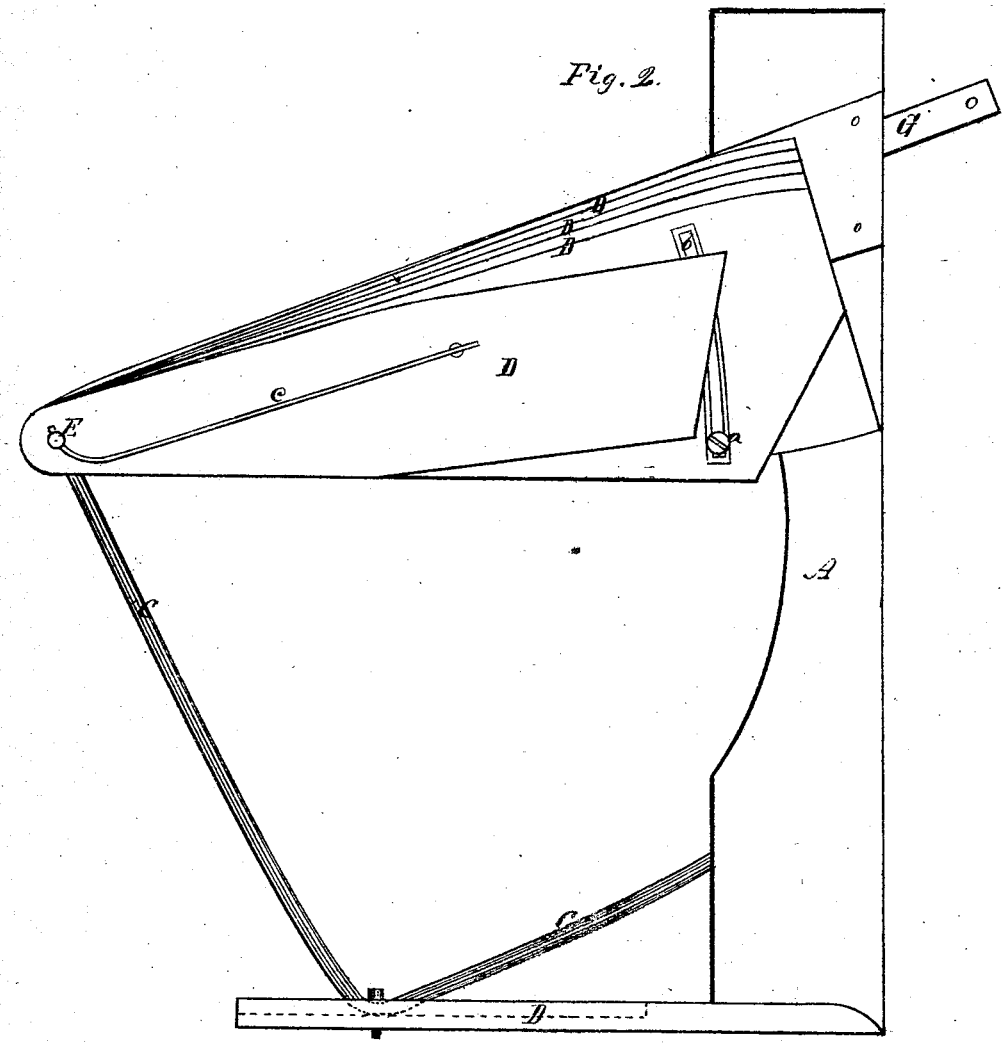
Figure 3:
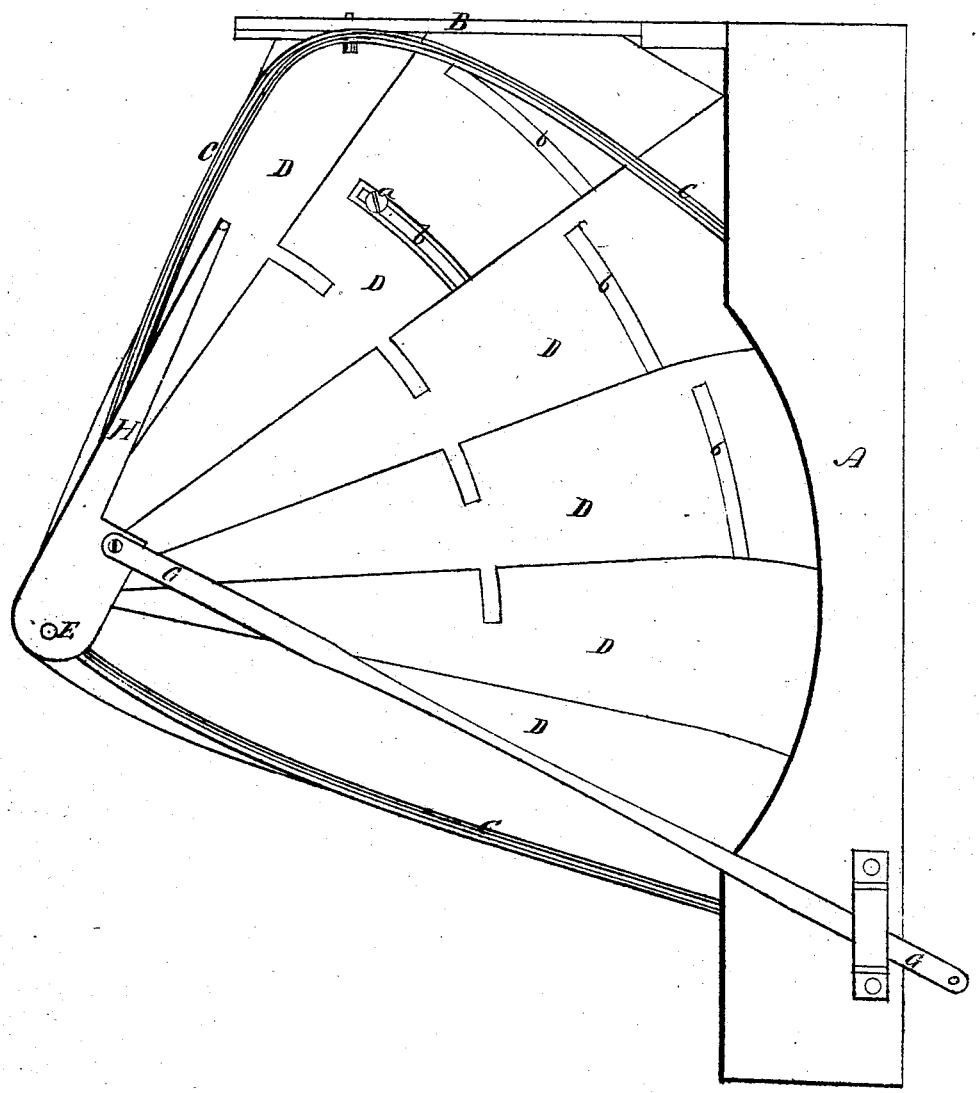

Figure 1 being a top view of the platform, shown spread out to its full width; Fig. 2, a plan of the same, showing the platform folded for dropping a gavel of grain therefrom; Fig. 3, a plan of the under side of the platform as spread out.

Like letters designate corresponding parts in all of the figures.

The nature of my invention consists in a platform for harvesters composed of several narrow parts folding and unfolding or shutting together, and spreading fan-like around a pivot or center in such a manner that, when spread out, they cover the platform-space and hold the grain; but, when folded or closed together, they let the bunch of grain down upon the ground.

Let A indicate the finger-bar of a harvester, and B the dividing-board and outer shoe thereof.

In order to apply my folding or shutting platform an iron rod or rods, C, is attached to the finger-bar and dividing-board in the manner represented, so as to form an outline frame to support the parts or slats D D which compose the platform. These slats are narrow at one end and wider at the other end, the narrow end receiving a pivot, E, at the rear inner angle of the frame C, so that they can be spread out around said pivot as a common center and cover the entire space of the platform, as shown in Figs. 1 and 3; but when folded or closed together, as in Fig. 2, they will occupy but little breadth of space, and thus cause or allow the grain to fall off upon the ground and make a gavel.

In order to produce the folding and unfolding of the platform, the driver, by any suitable device within his reach, draws or pushes upon a rod, G, which is pivoted to a lever, H, under the platform, which lever turns on the pivot E, and its outer end is secured to the outer slat of the platform. By drawing on the rod G the outer slat is drawn in and moves all of the other slats, except the inner one, successively into a folded or closed position; and, by pushing upon the rod, the outer slat is moved out to its outermost position, drawing after it the other slats successively. The several slats are connected together by bolts, screws, or pins $a$ $a$, one in each, which moves in a transverse concentric slot, $b$, of the adjacent slat, the length of each slot being sufficient to allow the adjacent slat, which bears the pin $a$ entering the same, to either spread out from over the contiguous slat, its edge just lapping over the same, or fold into a position directly over the said contiguous slat, so that when the outer slat is drawn inward each outer slat successively first shuts over the next inner slat and then draws it inward over the next inner slat until the platform is completely folded or closed, as in Fig. 2.

In order to facilitate the start of the platform in spreading it out a spring, $c$, may be secured at one end to the pivot E, (which in that case should not turn in its place,) and the other end be attached to the outer slat of the platform. The spring is so arranged that it will be bent in closing or folding the platform.

I do not confine my invention to the exact mode of constructing or arranging the platform, nor to the device for folding and unfolding its parts, as herein specified.

What I claim as my invention, and desire to secure by Letters Patent, is—

The folding platform, spreading and closing fan-like around a pivot or center, substantially as and for the purpose herein specified.

Specification signed by me this 8th day of May, 1871.

GEORGE B. DEARDORFF.

Witnesses:
JOSEPH W. NEWBURGH,
SAMUEL HAINES.